United States Patent [19]

Gusman et al.

[11] Patent Number: 4,975,415

[45] Date of Patent: Dec. 4, 1990

[54] CRYOCHEMICAL METHOD OF PREPARING ULTRAFINE PARTICLES OF HIGH-PURITY SUPERCONDUCTING OXIDES

[75] Inventors: Michael I. Gusman, Palo Alto; Sylvia M. Johnson, Piedmont, both of Calif.

[73] Assignee: SRI - International, Menlo Park, Calif.

[21] Appl. No.: 71,977

[22] Filed: Jul. 10, 1987

[51] Int. Cl.$^5$ .......................... C01F 17/00; C01G 3/02
[52] U.S. Cl. ...................................... 505/1; 505/730; 505/737; 505/738; 505/742; 264/12; 423/263; 423/593; 423/604
[58] Field of Search .............. 264/12; 505/1; 423/263, 423/593, 604; 252/521; 505/730, 734, 738, 742

[56] References Cited

U.S. PATENT DOCUMENTS

| | | | |
|---|---|---|---|
| 3,026,177 | 3/1962 | St. Pierre | 23/142 |
| 3,026,210 | 3/1962 | Coble | 106/39 |
| 3,357,819 | 12/1967 | Lansberg | 75/5 |
| 3,516,935 | 6/1970 | Monforte et al. | 252/62.56 |
| 3,551,533 | 12/1970 | Monforte et al. | 264/14 |
| 3,748,728 | 7/1973 | Watson | 29/599 |
| 3,932,315 | 1/1976 | Sleight | 252/521 |
| 4,049,789 | 9/1977 | Manabe et al. | 423/593 |
| 4,073,666 | 2/1978 | Marancik | 148/11.5 Q |
| 4,264,358 | 4/1981 | Johnson | 75/134 F |
| 4,508,752 | 4/1985 | Takei | 427/48 |
| 4,581,289 | 4/1986 | Dietrich | 428/379 |

OTHER PUBLICATIONS

Bednorz et al, Z. Phys. B-Condensed Matter, 64, 189-193 (1986).
Geballe et al, Extended Abstracts, High Tc Superconductors-MRS EA 11, Apr., 1987 pp. 59-63.
Kelly et al, Journal of Materials Science, vol. 13 (1978) pp. 1053-1060.
Hirabayashi et al, Jap. J. of Applied Physics, vol. 26, No. 4, pp. L454-455.
Nakamura et al, Extended Abstracts, High Tc Superconductors-MRS EA 11, Apr., 1987 pp. 239-242.
Kubo et al, Extended Abstracts, High Temp. Superconducting-MRS EA 11, Apr. 1987, pp. 265-267.
Materials and Processing Report vol. 2, No. 10, Jan. 1988 pp. 5-6.
D. W. Johnson et al., "Characterization of Freeze--Dried $Al_2O_3$ and $Fe_2O_3$," Journal of the American Ceramic Society, vol. 53, No. 8, pp. 440-444 (1974).

(List continued on next page.)

Primary Examiner—Norman Morgenstern
Assistant Examiner—Margaret Bueker
Attorney, Agent, or Firm—Phillips, Moore, Lempio & Finley

[57] ABSTRACT

The present invention pertains to a method of preparing particles of superconducting ceramic powders, which method comprises:

(a) dissolving the soluble salts of the cations in aqueous medium;
(b) obtaining a solution having pH of between about 4 and 7 by optionally treating the aqueous medium with ammonia, or ammonium hydroxide;
(c) atomizing the solution of step (b) onto liquid nitrogen at about $-196°$ C.;
(d) removing the liquid nitrogen by evaporation;
(e) removing the water by sublimation at reduced pressure;
(f) heating the solid residue of step (e) at 40-60° C. at reduced pressure;
(g) calcining the solid residue in flowing oxygen or air at temperature of between about 200° to 895° C.; and
(h) cooling the solid at a temperature of between about 900° C. and ambient temperature in sufficient air or oxygen and recovering the superconducting powder having an average diameter of between about 0.1 and 10 microns.

Optionally, substep (h), additionally includes during cooling, the annealing of the particles in sufficient oxygen at between about 200° and 500° C. for between about 2 and 30 hrs. $YBa_2Cu_3O_{7-d}$ (where d is 0-1) is preferred superconducting powder.

26 Claims, 4 Drawing Sheets

OTHER PUBLICATIONS

A. C. C. Tseung et al., "Preparation and Characterization of High Surface Area Semiconducting Oxides," *Journal of Materials Science*, vol. 5, pp. 604–610 (1970).

V. V. Mirkovich et al., "Use of Liquid Nitrogen In Spray Freezing," *Ceramic Bulletin*, vol. 49, No. 8 (1970).

Y. S. Kim et al., "Theoretically Dense (99.9%) Polycrystalline Alumina Prepared from Cryochemically Processed Powders," *Ceramic Bulletin*. vol. 50, No. 6 (1971).

H. A. Sauer et al., "Freezing Droplets of Aqueous Solutions for the Cryochemical Process," *American Institute of Chemical Engineering Journal*, vol. 18, No. 2, pp. 435–437 (1971).

S. R. Ovshinsky et al., "Superconductivity at 155K," *Physical Review Letters*, vol. 58, No. 24 (6/15/87), pp. 2579–1581.

T. H. Geballe et al., "Some Thoughts About the High To Perovskite Superconductors," in the Extended Abstracts for the MRS Symposium in High Temperature Superconductors, Anaheim, Calif., Apr. 23–24, 1987.

Ron Dagani, "Superconductivity: A Revolution in Electricity Is Taking Shape," *Chemical and Engineering News*, pp. 7–16, May 11, 1987.

CRYOCHEMICAL METHOD OF PREPARING ULTRAFINE PARTICLES OF HIGH-PURITY SUPERCONDUCTING OXIDES

BACKGROUND OF THE INVENTION

1. Field of the Invention

This invention relates to superconducting ceramic particles. More particularly, it pertains to a method of preparing small particles of high-purity superconducting oxides, such as $YBa_2Cu_3O_{(7-d)}$ (d=0 to 1), by a freeze-drying technique, which involves atomizing an aqueous solution of the soluble salts onto liquid nitrogen, followed by subliming of the frozen water, calcining and heating in air or oxygen.

2. Description of Related Art

Most reports on the preparation of superconducting ceramic oxides indicate that only crude methods of powder preparation are used, such as calcining the oxide followed by mechanical grinding. The powders produced by these methods are not ideal according to conventional practice. Major problems associated with these powders include inhomogeneity, non-uniformity in terms of particle size, shape, high impurity levels e.g., from milling, and lack of reproducibility. Conducting materials fabricated from these powders may exhibit some superconducting behavior; however, the current densities are usually low and the microstructure is far from controllable. Anomalies in superconducting behavior are often traced to the powder and its size.

An overview of the recent progress in the preparation of superconducting ceramic oxides by Ron Dagani is found in *Chemical and Engineering News*, pp 7-16, published May 11, 1987, which is incorporated herein by reference. The new materials are metal oxide ceramics, usually having a perovskite-like or spinel-like structure, which can conduct electricity with virtually no resistance at temperatures at or above the boiling point of liquid nitrogen (77K or $-196°$ C.). These materials are useful to conduct electricity for hundreds of miles with no dissipative losses, and no heating up of the transmission lines. These superconductors would also be useful in supercomputers, in magnetically levitated high speed trains, improved nuclear magnetic resonance scanners, and the like.

F. R. Monforte et al., in U.S. Pat. No. 3,516,935 disclose a method of freeze-drying an aqueous solution of soluble salts. It discloses methods of forming the solution, droplet formation, freezing, collection of the frozen droplets, sublimation, conversion, forming and firing. By following the methods described, one would not obtain superconducting powders.

F. R. Monforte et al., in U.S. Pat. No. 3,551,533 disclose a preparation of particulate matter by freeze-drying an atomized solution of soluble salts. A number of solute, solution, freezing, collection, sublimation, conversion, and crushing conditions are described. Sizes of particles range from 1 micron to 0.4 millimeters. This patent does not disclose the process by which superconducting oxide powders are obtained.

A. Lansberg in U.S. Pat. No. 3,357,819 discloses a process of preparing homogenous powders composed of ultrafine particles. A solution or dispersion of the salts are freeze dried by dripping into a cold solution, e.g. liquid nitrogen, followed by sublimation of the water from the particles. The patent does not refer to any subsequent treatment of the particles which is necessary to obtain superconducting oxides.

A. W. Sleight in U.S. Pat. No. 3,932,315 discloses superconductive barium-lead-bismuth oxides of the formula $Ba_{1-x}A_xPb_{1-y}Bi_yO_3$ wherein A is sodium, potassium, rubidium, cesium, strontium or lead, x is 0 to about 0.5 and y is about 0.05-0.3. The temperature marking the onset of superconductivity is low, a maximum of 13K.

J. Kelly et al., in the *Journal of Materials Science*, Vol. 13, pp. 1053-1060, published in 1978, disclose a study of a cryochemical method for the preparation of high surface area perovskite semiconducting powders. An aqueous solution is rapidly frozen in liquid nitrogen, followed by a vacuum sublimation of the ice. The sequence of steps necessary to obtain particles of a superconducting oxide of the present invention is not disclosed.

D. W. Johnson et al., in the *Ceramic Bulletin*, Vol. 53, No. 2, pp. 163-167, published in 1974, disclose the effect of preparative techniques and calcination temperatures on some lithium ferrites. The properties of the particles which were (1) sprayed dried, (2) freeze-dried or (3) co-precipitated were compared. This reference does not disclose the preparation of superconducting powders.

A. C. C. Tseung et al., in the *Journal of Materials Science*, Vol 5, pp. 604-610, published in 1970, disclose the preparation of high surface area lithium doped nickel oxide particles by spraying an aqueous solution of the salts into liquid nitrogen followed by sublimation and heating at 300° C.-1000° C. to produce the lithium nickel oxide. When silver chloride is present, a large excess of ammonia, to pH 2 or lower, is used to solubilize the silver ion. The materials nor the conditions described disclose or suggest a method of obtaining particles of a super conducting oxide.

V. V. Mirkovich et al., in *Ceramic Bulletin*, Vol. 49, (#8), pp 724-725, published in 1970, disclose the cryochemical method of preparing ceramic raw materials such as $Al_2(SO_4)_3 \cdot MgSO_4$ by spraying into stirred liquid nitrogen. The particles obtained have a spherical form which varies in size between 50 and 500 micrometers.

P. D. S. St. Pierre et al. in U.S. Pat. No. 3,026,177 disclose a method for producing particles of transparent polycrystalline high density alumina. This patent does not disclose a preparation of superconducting oxides.

Y. S. Kim et al., in the *Ceramic Bulletin*, Vol. 50 (#6), pp. 532-535, published in 1971 disclose a cryochemical preparation of powders of polycrystalline alumina.

H. A. Sauer et al., in the *American Institute of Chemical Engineering Journal*, Vol. 18 (#2), pp 435-437, published in 1972, disclose a cryochemical process to prepare particles of aqueous solutions. The droplets are introduced into the lower region of the cooled stirred liquid and rise up through an immiscible nonflamable refridgerant.

S. R. Ovshinsky et al., in *Physical Review Letters*, Vol 58 (#24), pp 2579-2081 disclose a superconducting oxide of $Y_1Ba_2Cu_3F_xO_y$ having a Tc at 155K. However, other researchers have thus far been unable to repeat this result.

T. H. Geballe et al., in "Some Thoughts About the High Tc Perovskite Superconductors", in the Extended Abstracts for the MRS Symposium in High Temperature Superconductors, Anaheim, Cal., Apr. 23-24, 1987, disclose some physical properties of $YBa_2Cu_3O_{(7-d)}$, where d is 0-1. The bulk sample was reported only as being prepared by a freeze-drying method. No additional description of the experimental details of the method was disclosed.

Other general methods of forming ceramic particles, alloys and bodies are described in U.S. Pat. No. 3,026,210; 3,748,728; 4,073,666; 4,264,358; 4,508,752; and 4,581,289.

It is usually observed that as the size of the particles of the superconducting compounds get larger, that superconducting properties become smaller. Powders having a size of 100 microns or larger (e.g. 200 microns) have reduced or vanishing small superconducting properties. These are the general sizes of the superconducting powders produced by methods of the art described above. Powder having a size of about 10 microns or less show useful superconducting properties. This is the size of the powders obtained in the present invention.

All of the above 20 references are incorporated herein by reference for general information in this art.

None of the references cited hereinabove separately or in combination disclose, teach or suggest the method of producing a superconducting oxide as is described by the present invention.

It is therefore an object of the invention to provide a method of producing a superconducting oxide by mixing soluble aqueous salts to form a solution, atomize this aqueous solution onto liquid nitrogen, remove the liquid nitrogen, remove the ice present by sublimation under reduced pressure, calcine the solid crystals and then heat at 800°-890° C. and cool to ambient temperature to obtain a superconducting oxide having a Tc of 77K or higher and a size of between about 0.05 and 10 microns. The present invention provides such an improved process.

SUMMARY OF THE INVENTION

The present invention relates to a method of preparing particles of superconducting ceramic powders, which method comprises:

(a) dissolving the soluble salts of cations in aqueous medium;

(b) obtaining a solution having a pH of between about 4 and 7 by optionally treating the aqueous medium with ammonia or ammonium hydroxide;

(c) atomizing the solution of step (b) onto liquid nitrogen at about −196° C. producing particles of the mixed salts and ice;

(d) removing the liquid nitrogen by evaporation;

(e) removing the water from the solid of step (d) by sublimation at reduced pressure under conditions which preclude melting or coalesence of the particles;

(f) heating the solid residue of step (e) at about 40°–60° C. at reduced pressure;

(g) calcining the solid residue in sufficient oxygen or air at temperature of between about 200° and 895° C.; and (h) cooling slowly the solid from a temperature of about 895° C. to about ambient temperature in sufficient air or oxygen and recovering the superconducting powder having an average diameter of between about 0.1 and 10 microns.

In another embodiment, optionally, substep (h), additionally includes during cooling, the annealing of the particles in sufficient oxygen or air at between about 200° and 500° C. for between about 2 and 30 hrs.

In another embodiment, the present invention relates to superconducting particles having a structure comprising:

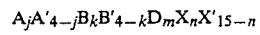

wherein:

A and A' are each independently selected from lanthanum, yttrium, samarium, europium, gadolinium, dysprosium, holmium or mixtures thereof;

B and B' are each independently selected from barium, strontium-calcium, barium-strontium or barium-calcium;

D is selected from platinum, copper, silver, tin or mixtures thereof;

X and X' are each independently selected from oxygen, fluorine or mixtures thereof;

j is between about 0.7 and 4;

k is between about 1.6 and 4;

m is between about 2.6 and 6; and n is between 4 and 15.

Preferably the final particles have spinel-like or a perovskite-like structure. Perovskite-like is preferred. These superconducting ceramic powders have a Tc above 77K and generally have a size in the range of 0.1 to about 10 microns, preferably about 0.5 to 2 microns.

DETAILED DESCRIPTION OF THE INVENTION AND PREFERRED EMBODIMENT

Definitions

Figure 1:
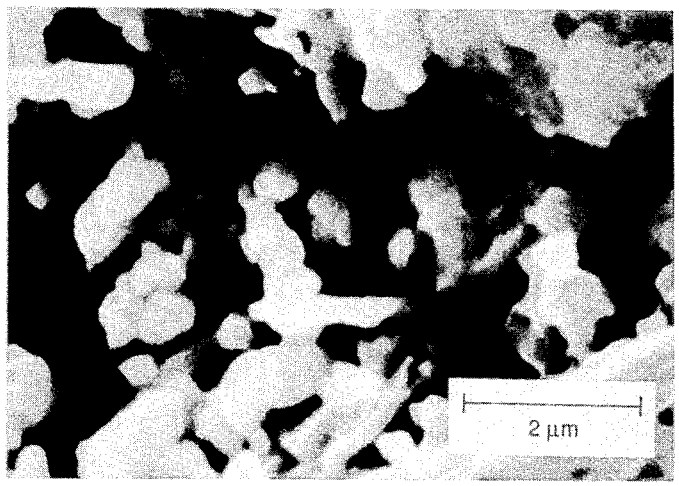
FIG. 1 shows the appearance of the powder at ambient temperature, $YBa_2Cu_3O_{(7-d)}(d=0-1)$, immediately after calcination at 825° C. before milling having a grain size of about or less than 2 microns (about 0.1 to 2 microns).

As use herein:

"Annealing" refers to heating at between about 200° and 700° C. an inorganic oxide in sufficient air or oxygen to add oxygen to the lattice structure, and stabilize the oxide at the same time the superconducting properties are stabilized.

"Atomizing" refers to the procedure of producing very fine particles usually of a liquid. It can include spraying through a nozzle, through a rotating disc, by ultrasonication or the like.

"Calcining" refers to heating a salt sample having an inorganic component at a temperature usually greater than 500° C. to remove gases. That is, a portion of the metal compound is oxidized, and is evolved as a gas, leaving a metal oxide residue, e.g. $Cu(NO_3)_2 \rightarrow 2CuO + 2NO_2$. Calcining is performed by observing the change in the weight of sample, and is complete when the weight of the heated sample remains constant.

"Cations" refers to those metal, transition metal, rare earth, alkaline earth cations which are useful to produce superconducting materials, such as oxides and/or fluorides. Cations includes but is not limited to lanthanum, yttrium, samarium, europium, gadolinium, dysprosium, holmium and the like. Mixtures of these cations are included. Additional cations include barium and mixtures of strontium, calcium and barium. Other cations include platinum, copper, silver, tin, and the like. Mixtures are contemplated. The cations and their mixtures usually in aqueous solution, are soluble in the presence of each other or produce a finely divided suspension which is suitable for atomizing. To obtain specific ratios of the cations in the final powders, one usually combines cations of like ratios in the aqueous solutions prior to atomizing.

"Ceramics" refers in, the ceramic of the present invention to mixed cation oxides, mixed cation halides, especially fluorides, or mixtures of oxides and fluorides. Ovshinsky et al., above, which is incorporated herein by reference, describes superconductors wherein about one in four oxygen atoms in $YBa_2Cu_3O_{7-d}$ is replaced by a fluorine atom. Other reported superconducting compounds include $YBa_2Cu_3O_6F$. The method of preparing superconducting compounds of the present invention include these superconductors having mixtures of oxygen and other atoms, such as oxygen-fluorine, which are superconducting above 77K.

"Optionally" or "optional" refers to an event or to a step which may or may not take place within the invention, or to a chemical or a component which may or may not be present.

"Perovskite" or "perovskite-like" refers to the class of minerals or compounds that relate in structure to $CaTiO_3$ or $MgSiO_3$. The superconducting ceramic, however, is usually a distorted, oxygen deficient form of perovskite with a layered structure not generally seen in naturally occurring minerals. On a simplistic level, the structure consists of near-planar arrays of metal (copper) and oxygen atoms. The metal atoms usually exist in different valence states. Because of this variability, the number of oxygen atoms also varies so that the oxygen's total negative charge balances the metal's positive charge.

PREPARATION OF THE SUPERCONDUCTING OXIDE PARTICLES-OXIDE

Although oxide is used in the following description, it is to be understood that oxides, fluorides, chlorides, bromides, sulfates, etc. can be used. The superconducting powder oxide can be an oxide, a fluoride, a mixture of oxide-fluoride and the like.

Step (a):

The soluble salts of the cations are weighed accurately and mixed with distilled or deionized water. Concentrations of each cation in solution is between about .015 and 0.15 molality. Both organic and inorganic salts are considered within the invention. Useful organic salts include for example, acetates, citrates, propionates, oxalates, tartrates, fumarates and the like. The acetates are generally preferred. The useful inorganic salts include the oxides, hydroxides, chlorides, fluorides, bromides, nitrates, carbonates, sulfates and the like. Generally, the nitrates are preferred. The sulfates are often only sparingly soluble, particularly $BaSO_4$. Thus, barium acetate is usually the salt of choice.

These salts need to be of high purity and free of interfering ions. The purity of the salts ranges from about 99.0 to 99.999% or higher and are available from chemical supply houses and are used as provided without additional purification.

A fine aqueous suspension or colloid of the salts is also contemplated in the present invention. These salts when used in the method of the present invention will produce fine particles of superconducting oxides.

In one embodiment, the superconducting oxides produced have the formula:

$$A_xA'_{1-x}B_yB'_{2-y}D_zO_q$$

wherein:
A and A' are each independently selected from lanthanum, yttrium, samarium, europium, gadolinium, dysprosium, holmium or mixtures thereof;
B and B' are each independently selected from barium or strontium-calcium, barium-strontium, or barium-calcium;
D is selected from platinum, copper, silver, tin or mixtures thereof;
x is about 1;
y is about 2;
z is about 3, and
q is about 7−d, where d is 0−1.

Thus, A or A' is nitrate or organic salts of lanthanum, yttrium, samarium, europium, gadolinium, dysprosium, holmium, or mixtures thereof. Primarily, the salts need to evole a gas to produce the oxide when calcined at about 500°–700° C. Yttrium and lanthanum nitrates are preferred.

The starting salts for the B or B' component is barium nitrate or barium organic salt. Other starting salts include mixtures of strontium acetate-calcium acetate, barium acetate-strontium acetate, or barium acetate-calcium acetate.

The starting salts for the D component of the superconducting oxide include platinum, copper, tin or silver nitrates. It is also possible to have mixtures of these salts such as copper-tin. Copper nitrate is preferred.

Some of the solutions are heated to about 90° C., e.g. $BaNO_3$, and all solutions are stirred for between about 2 and 16 hours (for convenience - overnight) at about 90° C.

Generally, commercial considerations require the use of concentrations of the salts near the saturation limit in the liquid phase at the freezing temperature of the solution. If the concentration of the cations in solution is reduced, the time necessary to remove the water/ice from the crystals becomes longer. Also increased expenditures for larger equipment, electricity, and the like are necessary to remove the large volume of solvent.

Step (b):

It was determined that obtaining a pH of the mixed solutions of cations of between about 4 and 7 was beneficial to the method. The sparingly soluble salts usually remained in solution. The control of pH also aids in the subsequent steps in that it aids in preventing the melting and/or coalescence of the particles. If melting or coalescence occurs in steps (c) to (h), usually the particles become too large to be readily sintered or to be useful super-conductors. If the mixture of salts do not produce a solution having a pH of between about 4 and 7, preferably between about 4 and 5, then ammonia or concentrated ammonium hydroxide is added to obtain the desired pH.

Step (c):

Next the aqueous solution is atomized, usually by spraying, onto liquid nitrogen at about −196° C. at ambient pressure. Usually contact with atmospheric moisture is not a problem. However, a nitrogen or helium atmosphere may be used if desired. The spray nozzle used is a standard thin layer chromatography spray nozzle (one source is from Wheaton Scientific of 1000 Tenth Street, Millville, N.J. 08332. The spray atomizer should be able to produce a fine spray of particles onto the liquid nitrogen. The liquid sprayed droplets generally have a size of between about 1 and 10 microns, although large and smaller droplets are useful. The pressure for the spray is provided by nitrogen; usually about 10-20 psig.

Generally, the solutions of the cations A, B and D are mixed and sprayed as a single solution. The cations of A, B and D are compatible and may or may not precipitate on standing at ambient temperature.

In one embodiment (b'), it is possible to have two or more cations in one solution and one cation in a separate solution. These three cation solutions are marginally compatible when mixed and allowed to stand. In this alternative technique, the two or more solutions are joined in a single mixing chamber in the spray line and are in contact with each other for about 60 seconds or less before being freeze-dried by spraying onto the liquid nitrogen. Some improvements in the final superconducting particles is seen in the powders prepared by this technique.

Thus, in one example, barium acetate and yttrium nitrate are combined to produce aqueous one solution. Copper nitrate aqueous solution is kept separate. The two solutions are atomized onto liquid nitrogen after mixing in the line about 30-60 seconds.

Step (d):

The liquid nitrogen is then removed by evaporation, usually at ambient pressure. However, if desired a vacuum of between about 700 and 1 mm of mercury may be employed. Gentle heat may also be added to speed the evaporation, e.g. placing the particles (liquid nitrogen) in a $-50°$ C. chamber.

It is critical that the ice-inorganic crystals formed do not melt or coalesce during this liquid nitrogen evaporation.

Steps (e) and (f):

The frozen beads (particles or crystals) are then subjected to a vacuum of less than about 200 mTorr and then slowly heated to about $40°-60°$ C. at about $5°$ C./min while the ice is removed by sublimation under vacuum. It is very important that the crystals do not melt or coalesce into larger particles at this stage. Control of the pH as described above usually prevents this melting problem. The particles tend to be hygroscopic after freeze-drying, and it is necessary to calcine the particles immediately to maintain small particle size.

Step (g):

After the ice is removed and the particles are gently heated, the particles are then calcined in oxygen (up to 100%). which is optionally flowing) (or about 1.5 l/min) or air (which is optionally flowing) at a temperature of about 200 to 825° C. to obtain a constant weight. The particles are then heated up to 825°-895° C. in oxygen or air (which are optionally flowing) to obtain a perovskite-like structure.

Step (h):

The particles are next cooled slowly from about 895° C. to ambient temperature in sufficient oxygen or dry air. The particles (powders) generally have a diameter of between about 0.1 and 10 microns. When cooled to $-196°$ C. or a higher (+) temperature, these particles exhibit superconductivity at temperatures greater than 77K.

In some instances, the particles in step (h), during the cooling, are held at between about 200° and 500° C. and annealed in flowing oxygen or air for between about 2 and 30 hrs.

It is determined in later experiments that the environment for heating above 200° C. in steps (g), (h), (G) and (H) herein needs only to contain oxygen. This is achieved by an oxygen or air environment in amounts sufficient to provide the oxygen to form the perovskite or perovskite-like structures. Flowing oxygen or air are methods to make certain that sufficent oxygen is present to form the desired oxygen-containing structures which have super conducting properties.

Weight loss studies indicate that calcination is essentially complete in 1 hr at 700° C. For longer times, there is evidence of some small weight gain. However, x-ray diffraction (XRD) indicates that only a small amount of the desired phase forms at this low temperature (700° C.) even after 49 hrs. Calcination and reaction at 825° C. for a time in excess of about 12 hrs results in the formation of the desired phase (perovskite) as evidenced by a very sharp X-ray pattern. FIG. 1 shows the appearance of particles of the present invention immediately after calcination, but without any milling. Individual particles range from less than about 0.5 microns to 1 micron. Some agglomeration is evident but light milling (e.g. low speed planetary ball milling for 15 minutes) readily breaks up these agglomerates.

Substantial sintering does not occur at 700° C., and samples sintered at these temperatures exhibit relatively poor Meissner effects. Sintering at 890° C. for 24 hrs. produced densities ranging from about 80 to 86% of the theoretical value. Higher densities, up to about 89% (of theoretical density of 6.36 g/cm$^3$) were achieved by sintering at 925° C. for about 12 hrs.

Figure 2:
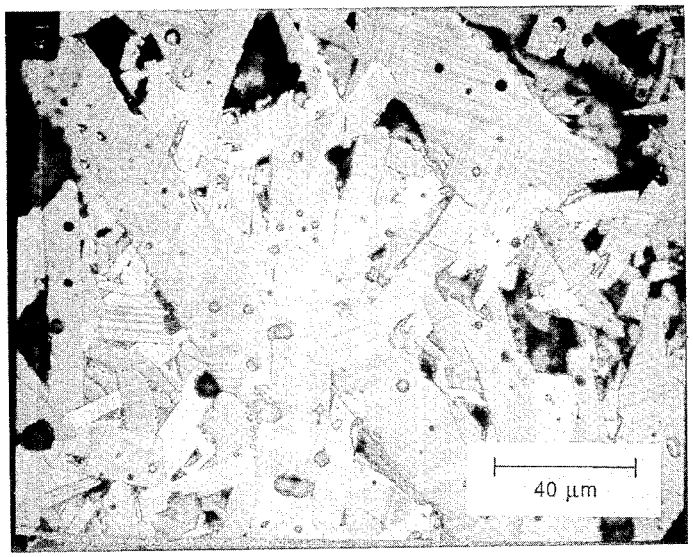
FIG. 2 shows the appearance of the powder at ambient temperature, $YBa_2Cu_3O_{(7-d)}$ ($d=0-1$), after it is sintered at 925° C., which material is heavily twinned with particles as large as 100 micrometers.

The difference in the microstructure of the powders caused by the increase of about 25° to 35° C. (900°-925° C.) in the sintering temperature is very great. Samples sintered at about 890° C. had very fine microstructure with grain sizes of less than about 2 microns. Samples sintered at 925° C. had some grains as large as 100 microns with high aspect ratios. Evidently, at about 900° C. or above the particles tend to melt and/or coalesce. These grains, as shown in FIG. 2, are heavily twinned and have grown very rapidly as shown by the number of included pores. A small amount of second phase is present along grain boundaries and in triangular pockets. Analysis of this phase by energy dispersion X-ray analysis (EDAX) indicated that it is Cu rich and Y poor in comparison to the major phase. A preliminary phase diagram for the baria-yttria-copper oxide system indicates that there is a region of partial melting associated with compositions toward the Cu-rich, Y-poor side of the "1-2-3" phase, and that melting occurs in the range of 875°-950° C. The course grains and the appearance of the second phase that appears to wet some boundaries is consistent with partial melting and associated change in sintering behavior.

Figure 3:
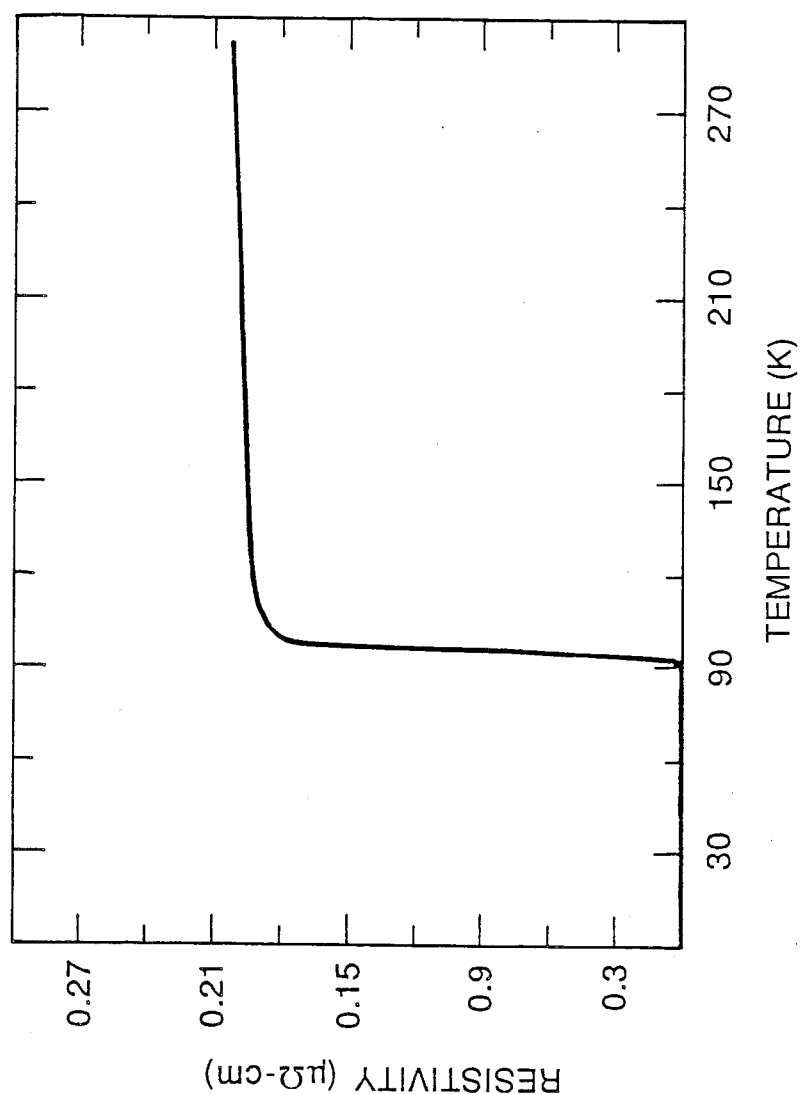
FIG. 3 is an example of the resistivity-temperature curve for a sintered sample of the ceramic oxide, $YBa_2Cu_3O_{(7-d)}$ ($d=0-1$).

An example of the resistivity-temperature curve for a sintered sample of $YBa_2Cu_3O_{7-d}$ (where d=0 to 1) (890° C. for 24 hr) is shown in FIG. 3. The resistivity drop-off in the ceramic samples made from the cryochemically produced powders is sharp, ranging from between 1-3K and the transition temperatures are in the range of 90-96K.

Figure 4:
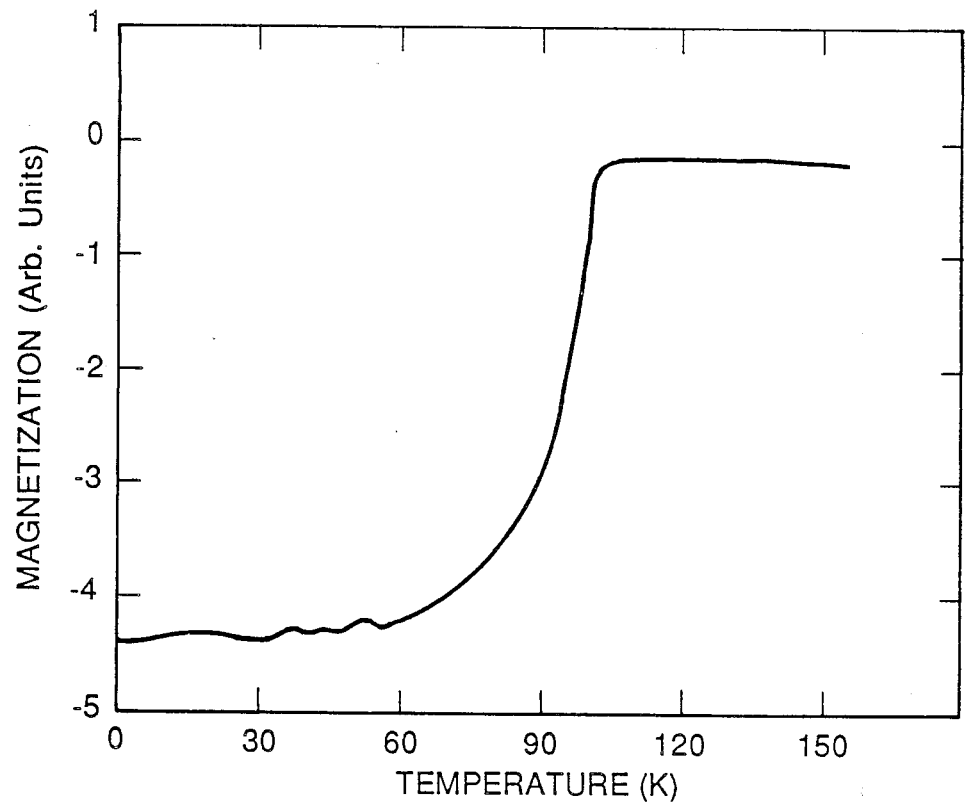
FIG. 4 is an example of the Meissner effect curve for the sintered sample of ceramic oxide, $YBa_2Cu_3O_{(7-d)}(d=0-1)$.

An example of the Meissner effect curve for a sintered sample (890° C., 24 hr) of $YBa_2Cu_3O_{6-7}$ is shown in FIG. 4. The ceramic powder has a relatively sharp Meissner effect, greater than 60% of the shielding signal.

Qualitive measurements of the Meissner effect, as evidenced by levitation distances, are performed on a number of ceramic samples. The measurements, which are generally comparative, indicate that a heat treatment of about 12 to 24 hrs. at about 400° C. or higher (preferably in flowing oxygen or air) will restore superconducting behavior of a sample of oxide which has deteriorated as a result of exposure to the atmosphere. In addition, this oxygen/heat treatment will cause previously non-superconducting samples (improperly handled or heated samples) to become superconducting. Further, the oxygen/heat treatment would increase the levitation effect on superconducting powders. Weight gains during oxygen/heat treatment of about 2-8 percent were found in a series of sintered samples treated with flowing oxygen (1.5 l/min) for 39 hrs. at 400° C. The largest weight gains were associated with the greater apparent increase in superconducting properties.

The ceramics produced by this method have small particle size, high purity, homogeneity and reactivity. The method is suitable for producing commercial quantities of superconducting ceramic, with batch size runs of 50–100 g easily achieved in the laboratory.

It is to be understood that the ceramic powders produced in this invention can have approximate compositions such as, $Y_{1.2}Ba_{0.8}CuO_4$, $YBa_2Cu_3O_w$, where w is between 6.5 and 7.2, etc. Preferred compositions are also described herein.

The following Examples are meant to be illustrative and representative only, and are not to be construed to be limiting in any way.

EXAMPLE 1

Preparation of $YBa_2Cu_3O_{(7-d)}$ (d=0-1)

(a) To a 2,500-ml beaker at STP containing a magnetic stirring bar and 1000 ml of distilled water is added 66.833 g of barium acetate (0.262 mol, 99.9% purity from Johnson-Matthey of Seabrook, N.H.). Yttrium nitrate, (99.9%) 50.00 g (0.131 mole) also from Johnson-Matthey, in 500 ml of distilled water is added next. Next is added 100 g of copper nitrate .3H$_2$O (0.393 mol of 99% purity), also from Johnson-Matthey. The components are all in solution after heating at 90° C. for 16 hrs. (overnight), pH about 4. The two liters of solution are spray atomized onto 4 liters of liquid nitrogen using a thin layer chromatography spray nozzle, over a 2.5 hr. period. The liquid ammonia is then removed by evaporation using a slight vacuum. While the ice/salt crystals are still at a very low temperature. A vacuum system is attached, and the ice is sublimed at 150 mTorr. Next, the solid is allowed to heat for 4–16 hrs. at 40°–60° C. under a vacuum of 300 mTorr. The sample is immediately calcined in flowing oxygen starting at 200° C. and increasing the temperature to 895° C. over a 4 hr. period. The oxides formed are then cooled in flowing oxygen (1.5 l/min.) to ambient temperature. The particles obtained have a size of between about 0.5 and 2 microns. When the oxide, $YBa_2Cu_3O_{7-d}$ where d is 0-1, is tested for superconductivity, the oxide has a Tc of about 94K (see FIG. 3).

(b) The procedure of Example 1(a) is repeated except, the molarity of the salts is doubled, and that after the salts are combined 14.3 ml of aqueous concentrated ammonia is added to produce a pH of 4.5. The powder obtained is essentially equivalent to that obtained in Example 1(a).

EXAMPLE 2

Preparation of Superconducting Oxides (a) Similarly as described above in Example 1(a) the procedure is repeated except that the yttrium nitrate is replaced by a stoichrometrically equivalent amount of:
(i) lanthanum;
(ii) samarium;
(iii) europium;
(iv) gadolinium;
(v) dysprosium; or
(vi) holmium.

It is expected that superconducting solid particles comparable to $YBa_2Cu_3O_{(7-d)}$ (d is 0 to 1) will be obtained.

(b) Similarly as is described in Example 1(b) the procedure repeated, except that the yttrium nitrate is replaced by a stoichiometrically equivalent amount of:
(i) lanthanum;
(ii) samarium;
(iii) europium;
(iv) gadolinium;
(v) dysprosium; or
(vi) holmium.

It is expected that superconducting solid particles comparable to $YBa_2Cu_3O_{(7-d)}$ (d is 0 to 1) will be obtained.

EXAMPLE 3

Preparation of Superconducting Oxides (a) Similarly as is described above in Example 1(a) the procedure is repeated except that the barium acetate is replaced by stoichrometrically equivalent amount of a 50/50 mixture of:
(i) strontium acetate - calcium acetate;
(ii) barium acetate - strontium acetate; or
(iii) barium acetate - calcium acetate. It is expected that superconducting solid particles comparable to $YBa_2Cu_3O_{7-d}$ (d is 0-1) will be obtained.

(b) Similarly as is described in Example 1(b) the procedure is repeated except that the barium acetate is replaced by stoichiometrically equivalent amount of a 50/50 mixture of:
(i) strontium acetate - calcium acetate;
(ii) barium acetate - strontium acetate; or
(iii) barium acetate - calcium acetate. It is expected that superconducting solid particles comparable to $YBa_2Cu_3O_{7-d}$ (d is 0-1) will be obtained.

EXAMPLE 4

Preparation of Superconducting Oxide (a) Similarly as is described in Example 1(a) above, the procedure is repeated except that the copper nitrate is replaced with a stoichiometrically equivalent amount of:
(i) platinum,
(ii) silver; or
(iii) tin.

It is expected that the superconducting oxide obtained will be comparable to $YBa_2Cu_3O_{(7-d)}$ where d is 0-1.

(b) Similarly as is described in Example 1(b) above, the procedure is repeated except that the copper nitrate is replaced with a stoichiometrically equivalent amount of:
(i) platinum,
(ii) silver; or
(iii) tin.

It is expected that the superconducting oxide obtained will be comparable to YBa$_2$Cu$_3$O$_{(7-d)}$ where d is 0-1.

EXAMPLE 5

Freeze-Dry Atomizing Using Two Solutions after Immediate Mixing (a) To separate 500 ml aqueous solutions are added yttrium salt (0.1 Molar in Y), barium salt (0.2 Min Ba) are combined and placed in a glass burette. A Cu salt solution (0.3 M in copper 500-ml) is placed in a separate burette. The burettes are connected using TYGON tubing and a glass Y-joint. The solutions are combined and mechanically mixed for less than 60 seconds at the Y joint then atomized using a thin layer chromotographic spray head. The flow-rates for spraying and subsequent steps were performed as described in Example 1(a) above. The superconducting powder obtained after heat treating at 825° C. has the same structure as found in Example 1(a) above.

While the present invention has been described with reference to the specific embodiments thereof, it should be understood by those skilled in the art of preparing uniform ultrafine powders and particles as described herein, and their use as superconductors that various changes may be made and equivalents may be substituted without departing from the true spirit and scope of the present invention. In addition, many modifications may be made to adapt a particular situation, material, or composition of matter, process, process step or steps to the spirit and scope of this invention, without departing from its essential teachings.

We claim:

1. An improved method of preparing fine particles of superconducting ceramic powders, which method comprises:
   (a) dissolving the soluble salts of cations in aqueous medium;
   (b) obtaining a substantially saturated solution of the salts and adjusting the pH to between about 4 and 7;
   (c) atomizing the solution of step (b) onto liquid nitrogen at about −196° C.;
   (d) removing the liquid nitrogen by evaporation of the nitrogen under reaction conditions such that the ice-salt crystals do not coalesce into larger particles;
   (e) removing the ice by sublimation at reduced pressure under reaction conditions such that the ice-salt crystals do not melt;
   (f) heating the solid residue of step (e) at about 40°-60° C. at reduced pressure under the reaction conditions such that the residue does not melt;
   (g) calcining the solid residue in sufficient oxygen or air at temperature of between about 200° and 895° C.; and
   (h) cooling slowly the solid at a temperature of between about 900° C. and ambient temperature in sufficient air or oxygen concurrently annealing the particles in flowing oxygen or air at between about 200° and 500° C. for between about 2 and 30 hrs and recovering the superconducting solid powder having an average diameter of between about 0.1 and 10 microns.

2. The method of claim 1 wherein in substep (b) the pH of about 4 to 7 of the aqueous solution is obtained by treating the aqueous medium with ammonia or ammonium hydroxide.

3. The method of claim 1 wherein the particles have a spinel or perovskite-like structure comprising:

$$A_xA'_{1-x}B_yB'_{2-y}D_zO_q$$

wherein:
A and A' are each independently selected from lanthanum, yttrium, samarium, europium, gadolinium, dysprosium, holmium or mixtures thereof;
B and B' are each independently selected from barium, strontium-calcium, barium-strontium or barium-calcium;
D is selected from platinum, copper, silver, tin or mixtures thereof;
x is about 1;
y is about 2;
z is about 3; and
q is 7-d, where d is between 0 and 1.

4. The process of claim 1 wherein in step (b) the pH is between about 4 and 5.

5. The process of claim 1 wherein in step (a) the soluble salts are selected from organic and inorganic salts.

6. The method of claim 5 wherein in step (a) the soluble salts are selected from nitrates or acetates.

7. The process of claim 5 wherein the concentration of the soluble salts is between about 0.015 and 0.15 molal.

8. The process of claim 7 wherein A and A' are each yttrium.

9. The process of claim 8 wherein D is copper.

10. The process of claim 9 wherein B and B' are each barium.

11. A method for producing particles of superconducting ceramic powders having a superconductivity transition temperature (T$_c$) of about 77K or greater, which method comprises:
   (A) dissolving the compatible soluble salts of the cations selected from nitrates or acetates in an aqueous medium;
   (B) obtaining a solution having a pH between about 4 and 7;
   (C) spray atomizing the solution of step (B) onto liquid nitrogen at about −196° C.;
   (D) removing the liquid nitrogen as a gas at about ambient temperature by evaporation without melting or coalescence of the ice-salt crystals;
   (E) removing the ice from the ice salt crystals by sublimation at reduced pressure without melting or coalescence of the ice-salt crystals into larger particles;
   (F) drying the salt crystals obtained in step (E) to about 40°-60° C. in a vacuum without melting or coalescence of the salt crystals;
   (G) calcining the solid residue of step (F) in sufficient oxygen or dry air at a temperature between about 200° and 895° C.; and
   (H) cooling slowly the solid of step (G) in an anhydrous atmosphere in sufficient oxygen or air to ambient temperature concurrently annealing the particles in sufficient oxygen or air at between about 200° and 700° C. for between about 2 and 30 hrs, and recovering the superconducting solid powder having an average diameter of between about 0.1 and 10 microns.

12. The method of claim 11 wherein in step B the pH is obtained by contacting the aqueous medium with sufficient ammonia or ammonium hydroxide.

13. The process of claim 11 wherein the ceramic powder consists essentially of a ceramic oxide of the formula:

$$A_x B_y D_z O_q$$

wherein:
A is selected from lanthanum, yttrium, samarium, europium, gadolinium, dysprosium, holmium, or mixtures thereof;
B is selected from barium, strontium-calcium, barium-strontium, or barium-calcium;
D is selected from copper, platinum, silver, tin, or mixtures thereof;
x is about 1;
y is about 2;
z is about 3; and
q is about 7-d, where d is 0-1.

14. The process of claim 11 wherein in step (A) the concentration of each soluble salt is between about 0.02 and 0.15 molal.

15. The process of claim 13 wherein A is yttrium.

16. The process of claim 15 wherein B is barium.

17. The process of claim 16 wherein C is copper.

18. The process of claim 11 wherein the ceramic particles of step (H) have an average diameter of between about 0.5 and 5 microns.

19. The process of claim 18 wherein the ceramic particles of step (H) have a diameter of between about 0.1 and 1.5 micron.

20. A method of preparing particles of superconducting ceramic powders, which method comprises:
(a) dissolving the soluble salts of the cations in two or more separate aqueous media;
(b) obtaining separate cation solutions having pH of about 4 and 7;
(b') mixing the separate solutions of steps (a) and (b) intimately for about 60 seconds then immediately;
(c) atomizing the solution of step (b') onto liquid nitrogen at about $-196°$ C.;
(d) removing the liquid nitrogen by evaporation under conditions such that the ice-salt crystals do not coalesce into larger crystals;
(e) removing the ice by sublimation at reduced pressure under reaction conditions such that the ice-salt crystals do not coalesce into larger particles;
(f) heating the solid residue of crystals of step (e) to about $40°$-$60°$ C. at reduced pressure;
(g) calcining the solid residue in sufficient oxygen or air at temperature of between about $200°$ and $895°$ C.; and
(h) cooling the solid at a temperature of between about $900°$ C. and ambient temperature in sufficient air or oxygen concurrently annealing of the particles in sufficient oxygen at between about $200°$ and $500°$ C. for between about 2 and 30 hrs and recovering the superconducting solid powder having an average diameter of between about 0.1 and 10 microns.

21. The method of claim 20 wherein in substep (b) the pH is obtained by treating the aqueous medium with ammonia or ammonium hydroxide.

22. The method of claim 1 wherein the particles have a structure comprising:

$$A_j A'_{4-j} B_k B'_{4-k} D_m X_n X'_{15-n}$$

wherein:
A and A' are each cations independently selected from lanthanum, yttrium, samarium, europium, gadolinium, dysprosium, holmium or mixtures thereof;
B and B' are each cations independently selected from barium, strontium-calcium, barium-strontium or barium-calcium;
D is a cation selected from platinum, copper, silver, tin or mixtures thereof;
X and X' are each independently selected from oxygen, fluorine or mixtures thereof;
j is between about 0.7 and 4;
k is between about 1.6 and 4;
m is between about 2.6 and 6; and
n is between 4 and 15.

23. The method of claim 22 wherein the particles after step (h) have a spinel or perovskite-like structure.

24. The method of claim 1 wherein in step (a) the cations are selected from metal cations, transition metal cations, rare earth cations or alkaline earth cations or mixtures thereof which are useful to produce superconducting materials.

25. The method of claim 24 wherein the cations are selected from metal cations.

26. The method of claim 1 wherein at least five cation solutions are mixed in substep (a).

* * * * *